United States Patent
Mielenz

(10) Patent No.: US 11,505,210 B2
(45) Date of Patent: Nov. 22, 2022

(54) METHOD AND DEVICE FOR THE AUTOMATIC CONTROL OF THE LONGITUDINAL DYNAMICS OF A VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 20 days.

(21) Appl. No.: 16/763,546

(22) PCT Filed: Oct. 31, 2018

(86) PCT No.: PCT/EP2018/079850
§ 371 (c)(1),
(2) Date: May 12, 2020

(87) PCT Pub. No.: WO2019/120727
PCT Pub. Date: Jun. 27, 2019

(65) Prior Publication Data
US 2020/0361486 A1    Nov. 19, 2020

(30) Foreign Application Priority Data
Dec. 20, 2017  (DE) .......................... 102017223480.6

(51) Int. Cl.
*B60W 60/00*    (2020.01)
*B60W 30/14*    (2006.01)
(Continued)

(52) U.S. Cl.
CPC ...... *B60W 60/0015* (2020.02); *B60W 30/146* (2013.01); *B60W 30/162* (2013.01);
(Continued)

(58) Field of Classification Search
None
See application file for complete search history.

(56) References Cited

U.S. PATENT DOCUMENTS 9,272,711 B1 *   3/2016  Sivaraman ............. G08G 1/166
2009/0299598 A1 * 12/2009  Boecker ................. B60W 30/16
                                                           701/96
(Continued)

FOREIGN PATENT DOCUMENTS

DE       19956455  A1    5/2001
DE    102004019164  A1   11/2005
(Continued)

OTHER PUBLICATIONS

Matsumoto, Shinji; Machine translation of JP-2003039979-A; Feb. 2003; espacenet.com (Year: 2003).*
(Continued)

*Primary Examiner* — David P. Merlino
(74) *Attorney, Agent, or Firm* — Norton Rose Fulbright US LLP; Gerard Messina

(57) ABSTRACT

A method for the automatic control of the longitudinal dynamics of a vehicle is provided by which vehicles traveling ahead are detected. If an upcoming traffic jam is detected, the vehicle is decelerated until a predefined distance behind the tail end of the traffic jam is reached. When the predefined distance from the traffic jam tail end has been reached, the vehicle automatically controlled in its longitudinal dynamics is able to close the remaining, predefined distance to the traffic jam tail end at a low differential velocity in comparison to the velocity of the traffic jam tail end. Using an additional rear sensor system that senses trailing vehicles, the controlled vehicle is made to close the distance to the traffic jam tail end only if a trailing vehicle was detected.

10 Claims, 4 Drawing Sheets

(51) Int. Cl.
*B60W 30/16* (2020.01)
*B60W 30/17* (2020.01)
*B60W 40/072* (2012.01)
*G08G 1/16* (2006.01)

(52) U.S. Cl.
CPC .......... *B60W 30/17* (2013.01); *B60W 40/072* (2013.01); *G08G 1/163* (2013.01); *G08G 1/166* (2013.01); *B60W 2420/42* (2013.01); *B60W 2420/52* (2013.01); *B60W 2420/54* (2013.01); *B60W 2552/05* (2020.02); *B60W 2554/406* (2020.02); *B60W 2554/802* (2020.02); *B60W 2555/20* (2020.02)

(56) References Cited

U.S. PATENT DOCUMENTS

| 2012/0123658 A1* | 5/2012 | Kagawa | G08G 1/164 |
| | | | 701/93 |
| 2014/0236449 A1* | 8/2014 | Horn | B60W 30/16 |
| | | | 701/96 |
| 2016/0039395 A1* | 2/2016 | Niwa | G05D 1/0055 |
| | | | 701/70 |

FOREIGN PATENT DOCUMENTS

| DE | 102005050277 A1 | 4/2007 |
| DE | 102007022589 A1 | 11/2008 |
| DE | 102007027138 A1 | 12/2008 |
| DE | 102014013544 A1 | 4/2015 |
| JP | 2003039979 A * | 2/2003 |
| JP | 2007182143 A | 7/2007 |
| JP | 2009151562 A * | 7/2009 |
| JP | 2012081924 A | 4/2012 |
| JP | 2012228979 A | 11/2012 |
| JP | 2017030435 A | 2/2017 |
| WO | 9958359 A1 | 11/1999 |

OTHER PUBLICATIONS

Regh Fabian; Machine translation of DE-102014013544-A; Apr. 2015 (Year: 2015).*

International Search Report for PCT/EP2018/079850, dated Jan. 21, 2019.

* cited by examiner

METHOD AND DEVICE FOR THE AUTOMATIC CONTROL OF THE LONGITUDINAL DYNAMICS OF A VEHICLE

The present invention relates to a method and a device for the automatic control of the longitudinal dynamics of a vehicle, which is equipped with a sensor system that senses vehicles traveling ahead, and when vehicles in front are detected, the velocity of the ego vehicle is reduced in that a device for detecting a traffic jam detects a traffic jam and outputs a signal; and when a traffic jam ahead is detected, the vehicle is decelerated until a predefined distance from the tail end of the traffic jam has been reached. When the predefined distance to the traffic jam tail end has been reached, the vehicle, autonomously controlled in its longitudinal dynamics, is able to close the remaining distance to the tail end of the traffic jam at a low differential velocity in comparison with the velocity of the tail end of the traffic jam. With the aid of a further rear sensor system, which senses vehicles driving behind, the controlled vehicle may cover the distance to the traffic jam tail end only if a trailing vehicle has been detected.

BACKGROUND INFORMATION

German Patent Application No. DE 10 2007 022 589 A1 describes a predictive safety device for motor vehicles, which is equipped with a near-field sensor system for locating objects in front of the vehicle, and a control unit, which analyzes the signals from the near-field sensor system in order to evaluate the risk of a looming collision, and which intervenes in the longitudinal control of the vehicle in the event of an imminent collision risk in an effort to avert the collision or to mitigate its consequences; a supplementary sensor system is provided for locating objects in the remaining environment of the vehicle, and the control unit is set up to use the data from the supplementary sensor system to calculate a longitudinal control strategy that minimizes the overall risk while taking objects in the remaining environment into account.

SUMMARY

The present invention provides a method and a device by which a vehicle, in particular an automatically or autonomously controlled vehicle, is decelerated in a timely manner when an upcoming traffic jam is detected, and which considerably reduce a collision risk, both for the vehicles traveling ahead and the trailing vehicles. According to the present invention, this is achieved by example embodiments of the present invention. Advantageous further developments and embodiments are described herein.

In accordance with an example embodiment of the present invention, it may be provided that a vehicle, in particular an automatically or autonomously controlled vehicle, that approaches the tail end of a traffic jam reduces the velocity of the ego vehicle well before it reaches the tail end of the traffic jam, in such a way that the following traffic closes the gap even before the ego vehicle reaches the tail end of the traffic jam and thus is decelerated by the ego vehicle. Because of the early deceleration, the vehicle interspaces are markedly larger than when the vehicles decelerate only at the last moment, which considerably reduces the risk of a collision and possible collision consequences.

In accordance with an example embodiment of the present invention, in an advantageous manner, it is provided that once the predefined distance to the tail end of the traffic jam has been reached, the vehicle automatically controlled in its longitudinal dynamics closes the remaining, predefined distance to the tail end of the traffic jam at a lower differential velocity than the velocity of the traffic jam tail end. In this way, the vehicle automatically controlled in its longitudinal dynamics no longer approaches the direct tail end of the traffic jam at a high velocity but has already reduced its largest portion of the differential velocity at distance d1 from the traffic jam tail end, so that remaining distance d1 until the tail end of the traffic jam is reached may be covered at a low differential velocity and thus carries a low collision probability.

In addition, it is advantageous that the vehicle has an additional sensor system by which trailing vehicles are detected; when the upcoming traffic jam is detected and after the vehicle has been decelerated at a predefined distance from the tail end of the traffic jam, the vehicle closes the remaining, predefined gap to the traffic jam tail at a lower differential velocity than the velocity of the traffic jam tail end only if a trailing vehicle has been detected. This has the result that the trailing vehicles also reduce their high differential velocity in a timely manner, and in the event of a possible rear collision with the vehicle controlled in its longitudinal dynamics, this vehicle will not be pushed into the vehicles in front, which are already at a standstill or driving very slowly, this being possible because an adequate distance d1 to the preceding vehicle at the tail end of the traffic jam is available. This further reduces the overall collision probability of all vehicles.

It is moreover advantageous that after the vehicle has been decelerated at a predefined distance d1 from the tail end of the traffic jam, the vehicle closes the remaining, predefined distance d1 to the traffic jam tail end at a lower differential velocity than the velocity of the tail end of the traffic jam only if the further sensor system has detected a trailing vehicle that falls short of a second predefined distance d2. In this way, the trailing vehicle has already reduced a large portion of its differential velocity and only then does the ego vehicle close the gap to the remaining traffic jam end, so that the driving situations with small distances are also driven only at low differential velocities.

It is furthermore advantageous that the vehicle automatically controlled in its longitudinal dynamics stops at predefined distance d1 from the tail end of the traffic jam and closes the remaining, predefined distance to the tail end of the traffic at a low differential velocity in comparison with the velocity of the traffic jam end only if a trailing vehicle has been detected whose differential velocity d3 was already largely decelerated in comparison with the velocity of the ego vehicle. This measure ensures that the ego vehicle controlled in its longitudinal dynamics closes the gap to the traffic jam tail end only if a trailing vehicle has actually approached. In traffic situations with few vehicles, this may possibly take longer than in dense traffic, so that even in the presence of low traffic, the ego vehicle controlled in its longitudinal dynamics will thus close the gap only if a trailing vehicle has been detected.

It is particularly advantageous that the differential velocity is considered largely reduced when the relative velocity amounts to a difference of maximally 30 km/h, in particular maximally 20 km/h, or maximally 10 km/h.

Moreover, it is advantageous that the currently traveled road type is detected with the aid of a sensor system, in particular by the first and/or the second sensor system, and the present method is activated as a function of the currently traveled road type. This ensures that a forward locomotion in a traffic jam will be activated only if the vehicle is traveling on a superhighway, a multi-lane national highway or a road developed as an expressway, but the present method will not be activated in inner city traffic and not at all in residential areas. For instance, the detection of the road type may be implemented using supplementary information in the map data of a navigation device, by data provided by an infrastructure service, via a mobile radio link, for instance, or else it may be detected by a sensor system in that the sensor system detects the presence of further vehicles traveling to the left in the next traffic lane and/or to the right of the currently traveled traffic lane. A radar sensor system or a video sensor system, for instance, or a LiDAR sensor system or an ultrasonic sensor system are able to be used as the sensor system.

It is furthermore advantageous that the first and/or second predefined distance d1, d2, and/or the maximum deviation of the velocity differential v3 between the vehicle driving behind and the ego vehicle depend(s) on the detected road type, the traffic density, the velocity used before the deceleration process is initiated, the current weather conditions, the presence of curves along the road or a combination thereof. In this way, the distances and differential velocities for the implementation of the present method may be made dependent on the traffic situation, for instance, because a correlation often exists between the number of traffic lanes and the permitted maximum velocity. In addition, the distances and differential velocities may be made dependent on the traffic density. The traffic density describes the number of vehicles that cross a route section within a predefined time unit or the number of vehicles that pass a point on the road within a certain time unit. In addition, the traffic density is detectable with the aid of an environment sensor system, for instance, because the number of overtaking as well as overtaken vehicles and the number of adjacently traveling vehicles are able to be detected with the aid of the sensor system. Moreover, the traffic density is detectable using devices for measuring the traffic density at superhighway overpasses, and the vehicle may be informed of these data by way of a radio link. It is also possible that cellular radio system providers make the traffic density information available via the configuration of the mobile radio cells, and this information is conveyed to the vehicle via a radio interface, for example. The current weather conditions are able to be acquired using a vehicle sensor system such as a windshield-wiper sensor, a video camera, an outside thermometer or else be forwarded to the vehicle via an infrastructure service by way of a radio link, for instance. The presence of curves on the traveled road describes the number as well as the radii of the traveled curves; in the case of curves having a small curve radius and more frequently occurring curves, the longitudinal control has to set shorter distances and differential velocities. This information is able to be provided on the basis of supplementary information of the map data from a navigation device or be provided from the history of the currently traveled road section.

It is furthermore advantageous that in a forward movement of the tail end of the traffic jam as it occurs when the vehicles are moving up in line, the automatically longitudinally controlled vehicle is moving as well while complying with the relative velocity values and distance values. If the traffic jam does not decelerate to a standstill but "creeps along" at a low velocity, then it is desirable that the ego vehicle likewise moves at this "creeping" locomotion velocity.

With regard to the device, it is advantageous that the control unit for controlling the longitudinal velocity of the vehicle continues to control the vehicle once the predefined distance from the traffic jam tail end has been reached and does so in such a way that the vehicle closes the remaining, predefined distance to the tail end of the traffic jam at a lower differential velocity than the velocity of the traffic jam tail end. This requires the longitudinally controlled vehicle to know the differential velocity and advantageously also the absolute velocity of the ego vehicle. For this, it is advantageous if the vehicle has a sensor system in the form of a radar sensor, a LiDAR sensor, or a stereo video camera. Systems using a mono camera, or an ultrasonic sensor system are also an option. A low differential velocity is provided in this context, i.e. when the relative velocity has a difference of maximally 30 km/h, in particular of maximally 20 km/h, or maximally 10 km/h.

It is furthermore advantageous that the vehicle has an additional sensor system which senses trailing vehicles, and if the traffic jam ahead is detected and the vehicle has been decelerated, the control unit outputs control signals to drive and deceleration devices of the vehicle for the control of the longitudinal velocity. This makes it possible for the vehicle, decelerated at a predefined distance from the tail end of the traffic jam, to close the remaining, predefined distance to the tail end of the traffic jam at a lower differential velocity than the velocity of the tail end of the traffic jam only if the additional sensor system has detected a trailing vehicle. In this case it may be provided that the vehicle, after having been decelerated at a predefined distance from the tail end of the traffic jam, closes the remaining, predefined distance to the tail end of the traffic jam at a lower differential velocity than the velocity of the tail end of the traffic jam only if the further sensor system has detected a trailing vehicle and its distance to the ego vehicle undershoots a second, predefined distance.

It is furthermore advantageous that the first sensor system for detecting vehicles in front and/or the further sensor system for detecting vehicles in back is/are an environment sensor or multiple environment sensors based on radar technology, video technology, LiDAR technology and/or ultrasound technology, and/or is/are made up of an interface for a data transmission via a car-to-car communication (C2C), and/or is an interface for a data transmission between the vehicle and a Cloud service.

An example method according to the present invention may be in the form of a control element, which is provided for a control device, in particular a head unit of an automatic vehicle control function or an autonomous vehicle control function of a motor vehicle. Stored on the control element is a program that is able to run on a processing device, in particular on a microprocessor or signal processor, and that is suitable for executing the method according to the present invention. In this case, the present invention is thus realized by a program stored on the control element, so that that this control element provided with the program constitutes the present invention in the same way as the method for whose execution the program is suited.

Additional features, application options and advantages of the present invention result from the description below of exemplary embodiments of the present invention, which are shown in the figures. All described or illustrated features form the subject matter of the present invention, on their own or in any combination, regardless of their formulation or illustrations in the description or in the figures.

BRIEF DESCRIPTION OF THE DRAWINGS

Below, exemplary embodiments of the present invention are described with the aid of figures.

DETAILED DESCRIPTION OF EXAMPLE EMBODIMENTS

In a vehicle that is driving in a highly automated manner, comfortable configurations of the movement strategies are generally preferred, which, for example, leads to a deceleration of 3 km/s$^2$ in the case of a looming blockade situation, e.g., as a result of a traffic jam. On roads that restrict a maximum velocity to 60 km/h, for instance, and in the event of an upcoming traffic blockage, the deceleration process is therefore initiated starting at a distance of approximately 60 m. The ego vehicle is thereby continually and comfortably decelerated in its velocity. A disadvantage is that the automatically controlled vehicle is the last vehicle in the traffic jam situation and a further vehicle may approach the traffic jam situation virtually without any deceleration. If this vehicle does not initiate a stop maneuver or an emergency stop maneuver, then a collision may possibly occur that may lead to severe damage due to the missing distance in front of the vehicle controlled in its longitudinal dynamics.

Figure 1:
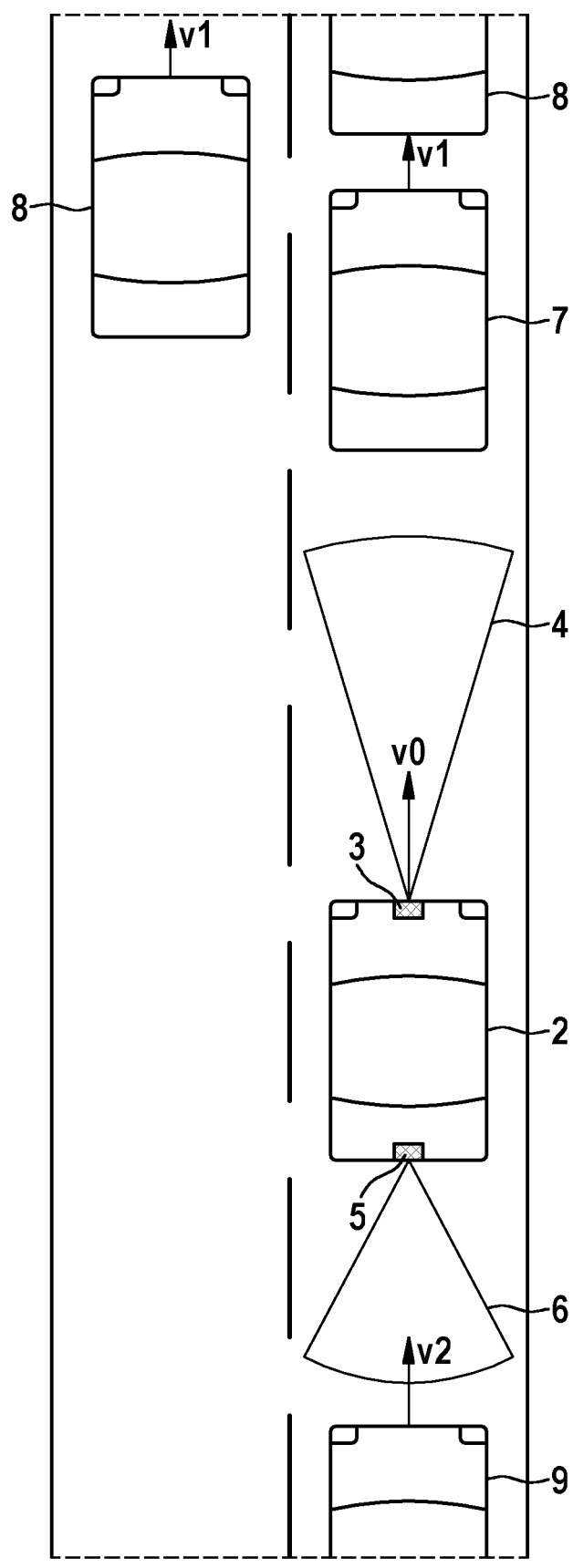
FIG. 1 shows an exemplary traffic situation in order to describe an example method according to the present invention.

In this context, FIG. 1 depicts a road 1 on which ego vehicle 2 controlled in its longitudinal dynamics is traveling. This ego vehicle 2 has a first sensor system 3, in particular an environment sensor system toward the front, which has a detection range 4 of first sensor system 3. Moreover, ego vehicle 2 includes an additional sensor system 5, which is particularly embodied as an environment sensor system toward the rear and forms a detection range 6 of second sensor system 5. This makes it possible to detect other road users 7, 8 in front of ego vehicle 2 and also road users 9 behind ego vehicle 2. Ego vehicle 2 is traveling on road 1 at a driving velocity v0. A vehicle 7 in front, which is at a standstill or is driving very slowly because it is approaching a traffic jam, is traveling in front of vehicle 2. Because of the traffic jam, additional vehicles 8 are shown next to and in front of vehicle 7 traveling in front. Further vehicles 8 and vehicle 7 ahead move only at a low velocity, which is dictated by the traffic jam and indicated by v1 by way of example. Ego vehicle 2, which is traveling at velocity v0, has a higher velocity because of the situation v0>v1 and needs to decelerate ahead of the tail end of the traffic jam and reduce its own velocity to v0. In addition, a trailing vehicle 9, which travels behind ego vehicle 2 at a velocity v2, is following ego vehicle 2. Because of the traffic jam situation in which preceding vehicle 7 and also the further vehicles 8 find themselves, ego vehicle 2 and also trailing vehicle 9 have to be decelerated at the lowest collision risk possible.

Figure 2C:
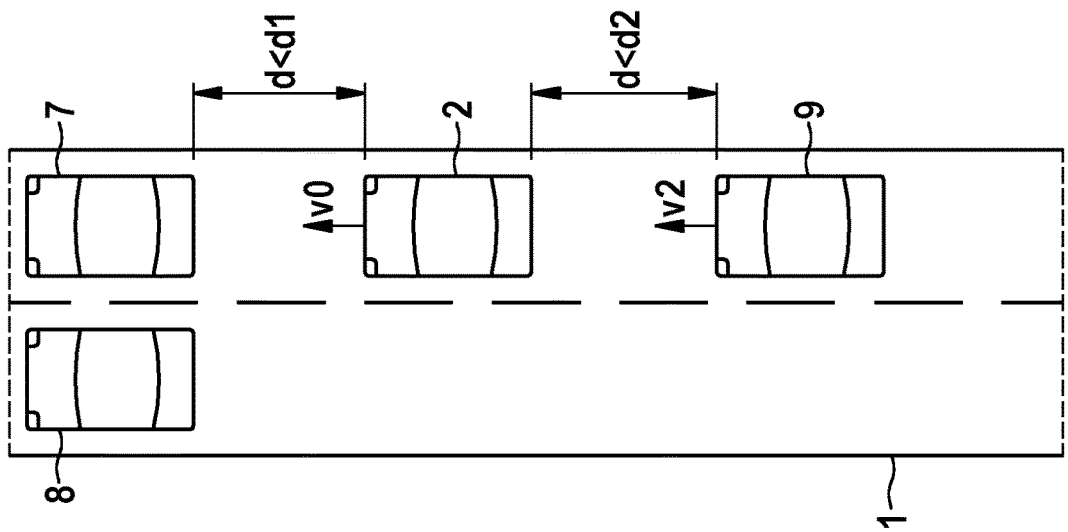
FIGS. 2a-2c show three partial drawings of an exemplary traffic situation in order to describe the example method according to the present invention.
Figure 2B:
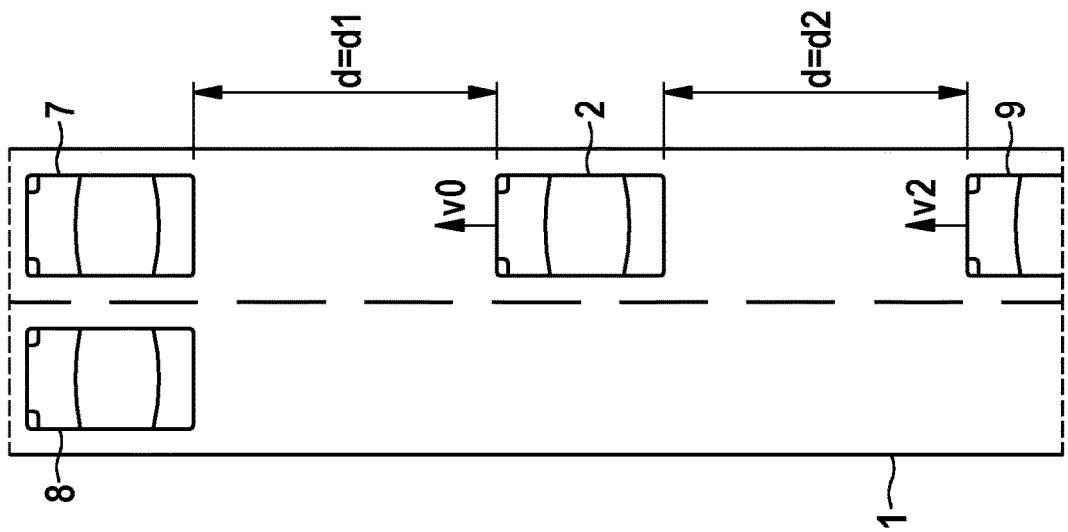
Figure 2A:
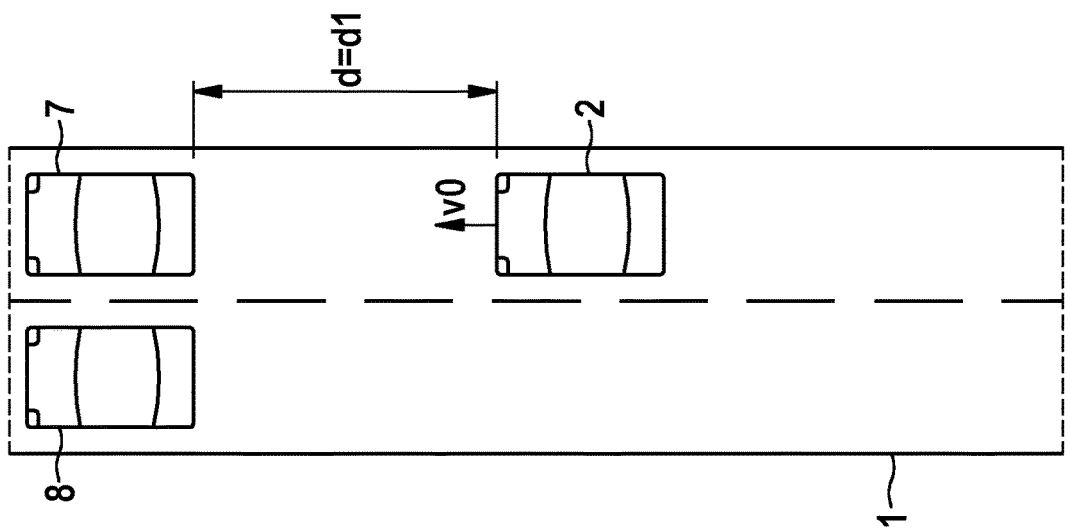

In this context, FIGS. 2a-2c show three partial figures a to c. FIG. 2a once again shows traveled road 1 on which ego vehicle 2 is driving at velocity v0. Situated at a distance d=d1 in front of ego vehicle 2 is preceding vehicle 7, as well as further vehicle 8 on the adjacent lane, which are either at a standstill or are driving at only a low velocity v1 on account of the traffic jam situation. Ego vehicle 2 therefore has to be decelerated, with the deceleration being carried out in such a way that once distance d=d1 has been reached, ego vehicle 2 has been decelerated to such a degree that v0 amounts to approximately v1. Alternatively, ego vehicle 2 may be brought to a standstill at distance d=d1.

FIG. 2b once again shows road 1 on which ego vehicle 2 has stopped at a distance d=d1 behind preceding vehicle 7 or is driving at a low velocity v0=v1. Approaching ego vehicle 2 from behind is vehicle 9, which is moving at velocity v2. The distance of trailing vehicle 9 is able to be ascertained with the aid of rear sensor system 5 of ego vehicle 2, so that once the distance of following vehicle 9 of d=d2 is undershot, ego vehicle 2 resumes driving from a standstill or slightly increases the low velocity in an effort to close the gap to vehicle 7 in front, which travels ahead or is at a standstill at a distance d=d1.

The last partial FIG. 2c once again shows road 1 with further vehicle 8 and vehicle 7 traveling ahead. Ego vehicle 2 approaches vehicle 7 at velocity v0 and has dropped below minimum distance d1 because it is closing the gap to preceding vehicle 7 during this phase. Trailing vehicle 9 follows ego vehicle 2 at a distance d that is lower than second distance value d2. If a collision should occur during this stopping maneuver, then the distances between the vehicles are large enough to avoid crashes and the differential velocities are at a minimum in order to keep any collision damage as low as possible.

Figure 3:
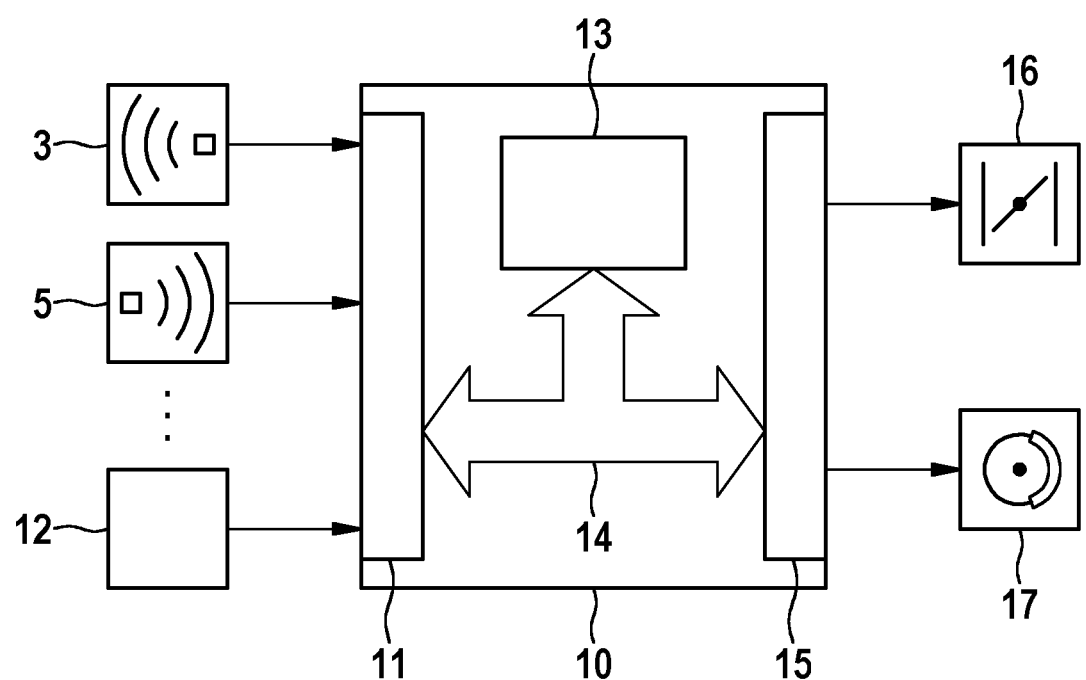
FIG. 3 shows a schematic block diagram of an example embodiment of the device according to the present invention.

FIG. 3 shows a schematic block diagram of control device 10. Control device 10 may be embodied as a control unit, e.g., a head unit of an automated driving function or an autonomous driving function. Control device 10 receives input signals with the aid of an input circuit 11. For example, the output signals from front sensor system 3 as well as from rear sensor system 5 are provided as input signals of control device 10. Front sensor system 3 and/or rear sensor system 5 provide(s) signals based on which control device 10 recognizes whether a vehicle 7 ahead or a trailing vehicle 9 is present, as well as their relative positions and relative velocities with respect to the ego vehicle. In addition, further sources of input signals 12 may be provided, e.g., operating devices for control device 10 in the form of control levers and/or switches for a driver operation, or radio receivers by which externally acquired and supplied data are able to be conveyed to the vehicle, and information about the weather, the traffic density or the currently traveled road type is thus provided. The output signals from information sources 3, 5, 12 supplied to input circuit 11 are conveyed via a data exchange device 14, which may be embodied as an internal bus, to a calculation device 13. A method according to the present method in the form of software is running in calculation device 13, which ascertains output signals from the input data and makes them available and carries out the method according to the present invention. The output signals supplied by calculation device 13 are conveyed via data exchange device 14 to an output circuit 15 of control device 10, which outputs the output signals to downstream actuating devices 16, 17. Provided as downstream actuating devices 16, 17, for example, may be a power-determining actuating element 16 for a drive machine such as a power controller for an electric motor, a throttle-valve adjustment device or a fuel-metering device of an internal combustion engine. In the same way, a deceleration device 17 of vehicle 2 may be provided as a downstream actuating element 16, 17 by which vehicle 2 is able to be decelerated without any input on the part of the driver. Because of the actuation of the power-determining actuating element 16 and deceleration device 17, velocity v0 of vehicle 2 is able to be adjusted and controlled according to the method of the present invention.

Figure 4:
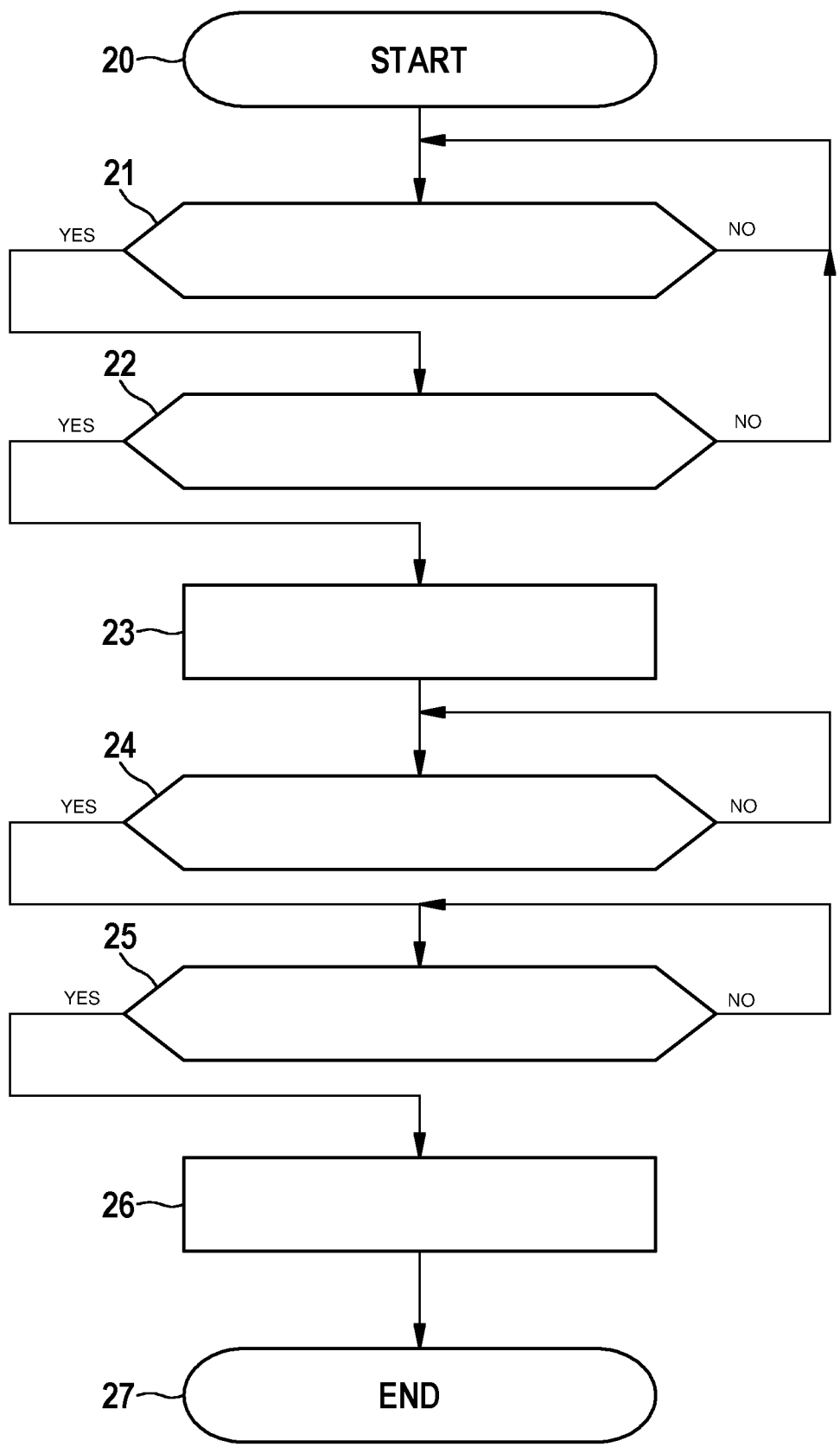
FIG. 4 shows an exemplary flow diagram in order to describe the example method according to the present invention.

FIG. 4 shows an exemplary flow diagram of the method according to the present invention, which begins with step 20. For instance, this start step 20 may be carried out when vehicle 2 is started up, when vehicle 2 enters a multi-lane road or a superhighway, or when the driver of vehicle 2 activates the function according to the present invention by operating a control element. In following step 21, it is checked whether an object 7 in front was detected with the aid of first sensor system 3 mounted at the vehicle front. If the traveled road is free and if first sensor 3 has not detected any vehicle 7 traveling ahead, branching back to step 21 takes place and a check is carried out whether vehicles 7 located in front are present until this has been positively determined. I a vehicle 7 traveling ahead was detected in step 21, step 21 branches to 'yes' and it is continued with step 22. In step 22, it is checked whether a traffic jam has been detected. For example, this may be realized in that vehicle 2 receives information indicating a traffic jam ahead via a radio interface, or in that vehicles 7, 8, which are either at a standstill or driving only very slowly, are detected on all traffic lanes available for driving, this being detected with the aid of first sensor 3 mounted at the front side of vehicle 2. As long as no traffic jam is detected, step 22 branches to 'no' and it is continued with step 21 by checking anew whether a vehicle 7 traveling ahead has been identified at all. If an upcoming traffic jam was detected in step 22, then the present method branches to 'yes', and continues with step 23 in that vehicle 2 is decelerated in such a way that it is stopped at distance d=d1 from vehicle 7 traveling ahead, which represents the tail end of a traffic jam. Alternatively, instead of stopping vehicle 2, it may also be decelerated to a very low target velocity. When the standstill or the target velocity has been reached, then further sensor 5 situated at the rear checks whether a trailing vehicle has been detected. As long as no trailing vehicle 9 is detected by second sensor 5 at the rear of the vehicle, step 24 branches back and the method continues with step 24 so that the method waits until a trailing vehicle 9 has been detected. When a trailing vehicle 9 is detected by further sensor 5, then step 24 branches to 'yes' and step 25 follows, in which a check takes place whether the distance of trailing vehicle 9 falls below distance d=d2 and/or its velocity v2 is less than a maximum velocity $v_{max}$. As long as this is not the case, the brakes of vehicle 2 remain active and the vehicle remains at a standstill or continues to move at the low velocity. If following vehicle 9 has dropped below velocity value d=d2 and/or the velocity v2 of the trailing vehicle has dropped below maximum velocity $v_{max}$, then step 25 branches to 'yes' and ego vehicle 2 moves up to the tail end of the traffic jam, in the form of vehicle 7 traveling ahead, in step 26, in that vehicle 2 continues its driving at a low velocity v0, which is only slightly above velocity v1 of vehicles 7, 8 in front. When the tail end of the traffic jam is reached and a minimum distance is attained, then the present method is concluded in following step 27, the traffic jam situation having changed in such a way that ego vehicle 2 no longer constitutes the tail end of the traffic jam but resumes driving inside the traffic jam at a low relative velocity in relation to objects, 7, 8, 9.

What is claimed is:

1. A method for automatically controlling longitudinal dynamics of an ego vehicle, the method comprising:

detecting, using a traffic jam detection arrangement, a traffic jam and outputting a signal, wherein the ego vehicle has a first sensor system to sense an other vehicle traveling ahead of the ego vehicle, and when the other another vehicle in front of the ego vehicle is detected, a velocity of the ego vehicle is reduced; and based on the detecting of the traffic jam, decelerating, by a control device having a deceleration device, the ego vehicle until a predefined distance to a tail end of the traffic jam has been reached;

wherein the control device for performing the decelerating includes an input circuit, wherein information signals from information sources, including the first sensor system, supplied to the input circuit are conveyed via a data exchange device to a calculation device, wherein the calculation device supplies output signals which are conveyed via the data exchange device to an output circuit of the control device, which outputs the output signals to downstream actuating devices, including a power-determining actuating element for a drive device, and the deceleration device by which the ego vehicle is decelerated without any input from a driver, so that by an actuation of the power-determining actuating element and the deceleration device, the velocity of the ego vehicle is adjusted and controlled, wherein, when the predefined distance to the tail end of the traffic jam has been reached, the longitudinal dynamics of the ego vehicle are automatically controlled to close the predefined distance to the tail end of the traffic jam at a differential velocity, based on a difference between the velocity of the ego vehicle and a velocity of the tail end of the traffic jam, wherein the ego vehicle has an additional sensor system by which a trailing vehicle is detected, and when the traffic jam is detected and after the ego vehicle has been decelerated to the predefined distance to the tail end of the traffic jam, the ego vehicle closes the predefined distance to the tail end of the traffic jam at a lower differential velocity than the differential velocity only if the trailing vehicle was detected, wherein the ego vehicle, for which the longitudinal dynamics of the ego vehicle are automatically controlled, stops at the predefined distance to the tail end of the traffic jam and closes the predefined distance to the tail end of the traffic jam at the differential velocity only if the trailing vehicle, which is trailing the ego vehicle, was detected having another differential velocity which was already decelerated in comparison with the velocity of the ego vehicle, wherein a road type of a road being currently traveled is determined using the first sensor system and/or the additional sensor system, and the method is activated as a function of the road type being currently traveled, wherein a first and/or second predefined distance and/or a maximum deviation of a velocity differential between the trailing vehicle and the ego vehicle, is a function of a presence of curves along the road being currently traveled and at least one of the following: the road type of the road being currently traveled, and/or a traffic density, and/or a velocity driven before initiating the deceleration, and/or current weather conditions, and wherein forward movement of the ego vehicle in the traffic jam is only activated when the ego vehicle is traveling on a superhighway, a multi-lane national highway, and/or an expressway, is not activated in inner city traffic and/or in a residential area traffic.

2. The method as recited in claim 1, wherein after the ego vehicle has been decelerated at the predefined distance to the tail end of the traffic jam, the ego vehicle closes the predefined distance to the tail end of the traffic jam at the lower differential velocity than the differential velocity of the tail end of the traffic jam only if the additional sensor system has detected the trailing vehicle, which is trailing the ego vehicle, is less than a second predefined distance from the ego vehicle.

3. The method as recited in claim 1, wherein the differential velocity is reduced when a relative velocity between the ego vehicle and the other vehicle amounts to a difference of maximally 30 km/h.

4. The method as recited in claim 1, wherein the differential velocity is reduced when a relative velocity between the ego vehicle and the other vehicle amounts to a difference of maximally 20 km/h.

5. The method as recited in claim 1, wherein the differential velocity is reduced when a relative velocity between the ego vehicle and the other vehicle amounts to a difference of maximally 10 km/h.

6. The method as recited in claim 1, wherein the road type of a road being currently traveled is determined using the first sensor system, and the method is activated as a function of the road type of the road being currently traveled.

7. The method as recited in claim 1, wherein in a forward movement of the tail end of the traffic jam, the ego vehicle, which is being automatically longitudinally controlled, is moved along while complying with a relative velocity value and a distance value.

8. A device for automatically controlling longitudinal dynamics of an ego vehicle, comprising:
a control device to control a longitudinal velocity of the ego vehicle, and to output control signals to a drive device and a deceleration device of the ego vehicle for controlling the longitudinal dynamics;
at least one first sensor system to detect vehicles in front of the ego vehicle, wherein a traffic jam is detected using data supplied by the first sensor system; and
wherein the control device is configured to, if the traffic jam is detected, decelerate the ego vehicle by an actuation of the drive device and the deceleration device until a predefined distance from a tail end of the traffic jam has been reached,
wherein the control device includes an input circuit, wherein information signals from information sources, including the at least one first sensor system, supplied to the input circuit are conveyed via a data exchange device to a calculation device,
wherein the calculation device supplies output signals which are conveyed via the data exchange device to an output circuit of the control device, which outputs the output signals to downstream actuating devices, including a power-determining actuating element for the drive device, and the deceleration device by which the ego vehicle is decelerated without any input from a driver, so that by an actuation of the power-determining actuating element and the deceleration device, a velocity of the ego vehicle is adjusted and controlled,
wherein, when the predefined distance to the tail end of the traffic jam has been reached, the longitudinal dynamics of the ego vehicle are automatically controlled to close the predefined distance to the tail end of the traffic jam at a differential velocity, based on a difference between the velocity of the ego vehicle and a velocity of the tail end of the traffic jam,
wherein the ego vehicle has an additional sensor system by which a trailing vehicle is detected, and when the traffic jam is detected and after the ego vehicle has been decelerated to the predefined distance to the tail end of the traffic jam, the ego vehicle closes the predefined distance to the tail end of the traffic jam at a lower differential velocity than the differential velocity only if the trailing vehicle was detected,
wherein the ego vehicle, for which the longitudinal dynamics of the ego vehicle are automatically controlled, stops at the predefined distance to the tail end of the traffic jam and closes the predefined distance to the tail end of the traffic jam at the differential velocity only if the trailing vehicle, which is trailing the ego vehicle, was detected having another differential velocity which was already decelerated in comparison with the velocity of the ego vehicle,
wherein a road type of a road being currently traveled is determined using the first sensor system and/or the additional sensor system, and the method is activated as a function of the road type being currently traveled,
wherein a first and/or second predefined distance and/or a maximum deviation of a velocity differential between the trailing vehicle and the ego vehicle, is a function of a presence of curves along the road being currently traveled and at least one of the following: the road type of the road being currently traveled, and/or a traffic density, and/or a velocity driven before initiating the deceleration, and/or current weather conditions, and
wherein forward movement of the ego vehicle in the traffic jam is only activated when the ego vehicle is traveling on a superhighway, a multi-lane national highway, and/or an expressway, is not activated in inner city traffic and/or in a residential area traffic.

9. The device as recited in claim 8, wherein when the traffic jam is detected and after the ego vehicle has been decelerated, the control device outputs control signals to the drive device and the deceleration device of the ego vehicle so that the ego vehicle is decelerated to the predefined distance to the tail end of the traffic jam, so as to close the predefined distance to the tail end of the traffic jam at the differential velocity between the velocity of the ego vehicle and the velocity of the tail end of the traffic jam only if the trailing vehicle was detected using the additional sensor system.

10. The device as recited in claim 9, wherein the first sensor system and/or the additional sensor system includes: (i) an environment sensor based on radar technology, or video technology, or LiDAR technology, or ultrasound technology, and/or (ii) an interface for data transmission via Car-2-Car communication, and/or (iii) an interface for a data transmission between the ego vehicle and a Cloud service.

* * * * *